United States Patent
Kadam et al.

(10) Patent No.: US 10,615,632 B2
(45) Date of Patent: Apr. 7, 2020

(54) CURRENT SHARING ARCHITECTURE FOR COMBINATION CHARGER

(71) Applicant: EATON CORPORATION, Cleveland, OH (US)

(72) Inventors: Nilesh Ankush Kadam, Maharashtra (IN); Arpit Agrawal, Maharashtra (IN); Saivaraprasad Murahari, Peachtree City, GA (US); Luis Salas, Fayetteville, GA (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 316 days.

(21) Appl. No.: 15/368,792

(22) Filed: Dec. 5, 2016

(65) Prior Publication Data
US 2018/0159341 A1 Jun. 7, 2018

(51) Int. Cl.
*H02J 7/00* (2006.01)
*H02J 7/14* (2006.01)
*H02J 7/04* (2006.01)
*H02J 7/02* (2016.01)

(52) U.S. Cl.
CPC .............. *H02J 7/045* (2013.01); *H02J 7/02* (2013.01)

(58) Field of Classification Search
USPC .................................. 320/107, 134, 136, 111
See application file for complete search history.

(56) References Cited

U.S. PATENT DOCUMENTS

| | | | |
|---|---|---|---|
| 9,153,986 B1* | 10/2015 | Herr ..................... | H02J 7/0044 |
| 2009/0100275 A1* | 4/2009 | Chang .................... | G06F 1/266 |
| | | | 713/300 |
| 2012/0166697 A1* | 6/2012 | Hu ........................ | H02J 7/0036 |
| | | | 710/300 |
| 2014/0091752 A1* | 4/2014 | Serrano ................ | H02J 7/0013 |
| | | | 320/107 |
| 2014/0167682 A1* | 6/2014 | Peabody ............... | H02J 7/0027 |
| | | | 320/107 |
| 2015/0357928 A1* | 12/2015 | Itakura ................... | H02M 1/10 |
| | | | 320/128 |
| 2016/0097522 A1* | 4/2016 | Chien .................... | F21V 33/00 |
| | | | 362/183 |
| 2016/0202743 A1* | 7/2016 | Li ............................. | G06F 1/26 |
| | | | 710/313 |
| 2016/0261128 A1* | 9/2016 | Johnston ............... | H02J 7/0036 |
| 2016/0352101 A1* | 12/2016 | Koo .......................... | H02J 1/12 |

(Continued)

*Primary Examiner* — Alexis B Pacheco
(74) *Attorney, Agent, or Firm* — Eckert Seamans Cherin & Mellott, LLC

(57) ABSTRACT

A charger apparatus a first port, a second port, a first circuit coupled to the first port, and a second circuit coupled to the second port. The charger also includes a controller, wherein the first circuit and the second circuit each receive a DC power signal generated from an AC input signal, and wherein the controller is structured and configured to determine whether a load current on the second circuit is above a threshold level and responsive to determining that the load current is above the threshold level, (i) cause the first circuit to advertise the first current at a level that is less than a maximum current level that may be advertised at the first port, and (ii) cause the second circuit to advertise the second current at a level that is equal to a maximum current level that may be advertised at the second port.

8 Claims, 3 Drawing Sheets

(56) References Cited

U.S. PATENT DOCUMENTS

| | | | |
|---|---|---|---|
| 2016/0380455 A1* | 12/2016 | Greening | H02J 7/0044 |
| | | | 320/114 |
| 2017/0060216 A1* | 3/2017 | Waters | G06F 1/30 |
| 2017/0141608 A1* | 5/2017 | Stenger | H02J 7/1461 |
| 2018/0074564 A1* | 3/2018 | Paparrizos | G06F 1/266 |
| 2018/0224913 A1* | 8/2018 | Kaestner | G06F 1/266 |

* cited by examiner

CURRENT SHARING ARCHITECTURE FOR COMBINATION CHARGER

BACKGROUND

Field

The disclosed concept pertains generally to chargers for charging electrical devices, and, more particularly, to a combination charger that includes a current sharing architecture for multiple types of output ports, such as USB Type-A and USB Type-C ports.

Background Information

USB-C is the emerging industry-standard connector for transmitting both data and power, and will likely be the next generation of cross-platform connectors. As a result, it is likely that next generation electrical devices coming to the market will have both USB Type-C ports/connectors and traditional USB Type-A ports/connectors.

There will thus be need for a combination charger that is able to charge devices having either a USB Type-C port/connector or a traditional USB Type-A port/connector as needed.

SUMMARY

In one embodiment, a charger apparatus is provided that includes a housing, a first port supported by the housing, a second port supported by the housing that is different than the first port, a first circuit coupled to the first port and structured to advertise a first current at the first port, and a second circuit coupled to the second port and structured to advertise a second current at the second port. The charger also includes a controller, wherein the first circuit and the second circuit each receive a DC power signal generated from an AC input signal provided to the charger apparatus, and wherein the controller is structured and configured to determine whether a load current on the second circuit is above a threshold level and responsive to determining that the load current on the second circuit is above the threshold level, (i) cause the first circuit to advertise the first current at a level that is less than a maximum current level that may be advertised at the first port, and (ii) cause the second circuit to advertise the second current at a level that is equal to a maximum current level that may be advertised at the second port.

In another embodiment, a method of controlling a charger apparatus that includes a first port and a second port of a different type than the first port is provided. The method includes receiving a DC power signal generated from an AC input signal provided to the charger apparatus, determining whether a load current being provided to the second port is above a threshold level, and responsive to determining that the load current being provided to the second port is above the threshold level, (i) causing the first port to advertise a first current at a level that is less than a maximum current level that may be advertised at the first port, and (ii) causing the second port to advertise a second current at a level that is equal to a maximum current level that may be advertised at the second port.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
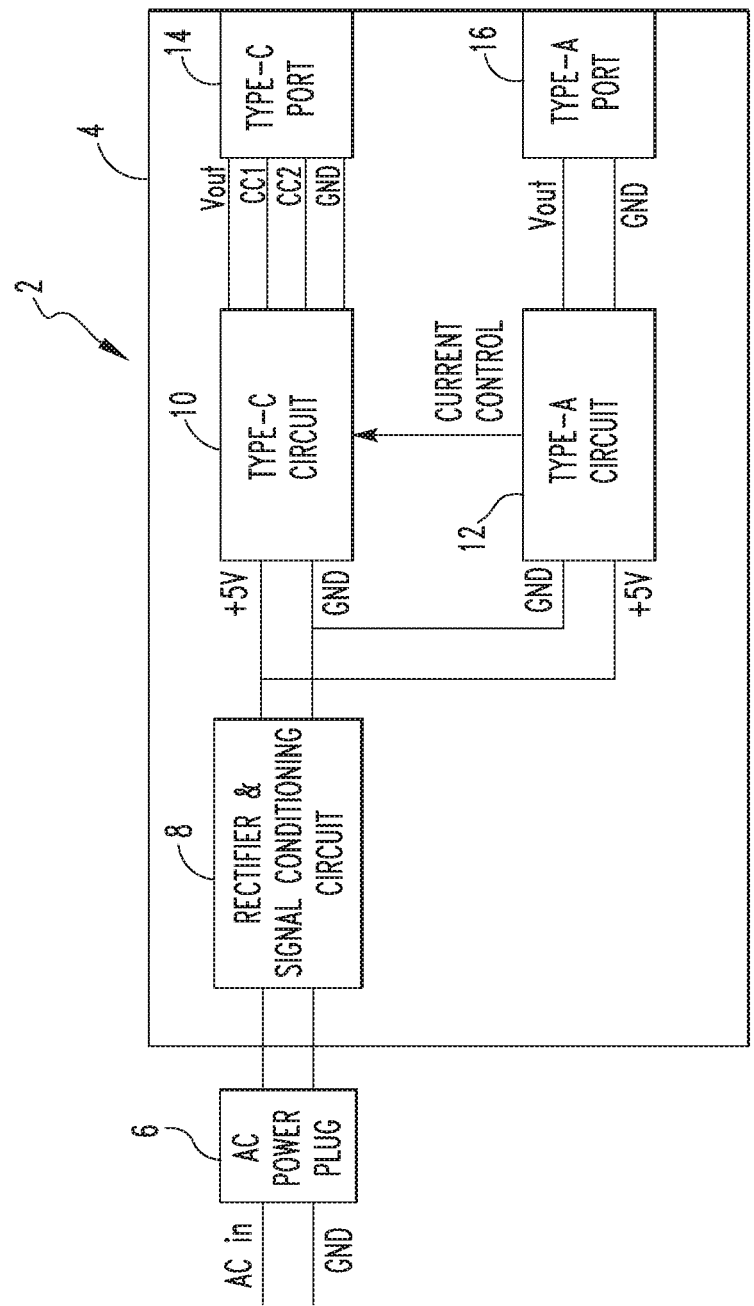
FIG. 1 is a schematic diagram of a combination charger apparatus according to an exemplary embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As used herein, the term "number" shall mean one or an integer greater than one (i.e., a plurality).

As used herein, the statement that two or more parts are "coupled" together shall mean that the parts are joined together either directly or joined through one or more intermediate parts.

As used herein, the term "controller" means a programmable analog and/or digital device (including an associated memory part or portion) that can store, retrieve, execute and process data (e.g., software routines and/or information used by such routines), including, without limitation, a programmable system on a chip (PSOC), a field programmable gate array (FPGA), a microprocessor, a microcontroller, a programmable logic controller, or any other suitable processing device or apparatus. The memory portion can be any one or more of a variety of types of internal and/or external storage media such as, without limitation, RAM, ROM, EPROM(s), EEPROM(s), FLASH, and the like that provide a storage register, i.e., a non-transitory machine readable medium, for data and program code storage such as in the fashion of an internal storage area of a computer, and can be volatile memory or nonvolatile memory.

As USB-C emerges as the next generation platform, combination charger devices that are capable of charging through both USB-C and USB-A connections (separately or at the same time) will become advantageous. Such chargers, however, will likely have design constraints (based on, for example, the charger form factor) that limit the total current that is available for charging at any one time (e.g., to a total of 4.5 A being available). As will be appreciated, that total current will have to be shared between the Type-A and Type-C ports/connections of the charger. This means that only of the connected devices can get the "maximum" current (e.g., 3 A) at any one time, while the other device has to settle for less current (e.g., 1.5 A).

Most existing electrical devices, however, utilize a USB Type-A port for charging. Thus, in the near future, it will be more likely that a Type-A device will be plugged in to such a combination charger for charging than a Type-C device. The disclosed concept thus provides an innovative charging architecture that automatically assigns the current priority to Type-A devices over Type-C devices by sensing the load current. As Type-C devices become more prevalent, the same architecture may be used with minor modifications to assign the current priority to Type-C devices over Type-A devices by sensing load current.

FIG. 1 is a schematic diagram of a combination charger apparatus 2 according to an exemplary embodiment of the disclosed concept. Combination charger apparatus 2 implements the priority charging architecture described above and thus has the ability to charge through both USB-C and USB-A connections. Combination charger apparatus 2 includes a housing 4 for housing the components thereof. Combination charger apparatus 2 further includes an AC power plug 6 for connecting combination charger apparatus 2 to an AC source, such as a wall outlet, in order to provide AC input power to combination charger apparatus 2.

Combination charger apparatus 2 further includes a rectifier and signal conditioning circuit 8 that is provided within housing 4. Rectifier and signal conditioning circuit 8 receives the AC input power from AC power plug 6 and converts it into DC power of an appropriate level. In the illustrated embodiment, rectifier and signal conditioning circuit 8 converts the AC input power in to +5V and ground. Alternatively, rectifier and signal conditioning circuit may be replaced by, for example, without limitation, a low dropout (LDO) regulator, a switch mode power supply (SMPS), or any other power supply. As seen in FIG. 1, combination charger apparatus 2 further includes a Type-C circuit 10 and a Type-A circuit 12, each of which is described in greater detail herein. Type-C circuit 10 and Type-A circuit 12 each receive the DC output of rectifier and signal conditioning circuit 8. Combination charger apparatus 2 further includes a USB Type-C port 14 and a USB Type-A port 16 to enable both Type-C and Type-A devices to be selectively connected to combination charger apparatus 2 for charging purposes.

As described in greater detail herein, in the exemplary embodiment, Type-C circuit 10 and Type-A circuit 12 together implement a current priority scheme wherein Type-A is given current priority over Type-C. More specifically, in the scheme of the exemplary embodiment, combination charger apparatus 2 monitors Type-A port 16 to determine whether and when a device is connected thereto or when a device is connected and requesting more charge. If combination charger apparatus 2 detects that a device is not connected to Type-A port 16 or the device is drawing more current than a set threshold (by sensing load current as described herein), combination charger apparatus 2 is configured such that Type-C port 14 will advertise a maximum current level (e.g., 3 A) and Type-A port 16 will advertise a lower set current level (e.g., 1.5 A). Conversely, if combination charger apparatus 2 detects that a device is connected to Type-A port 16 (again by sensing load current as described herein), combination charger apparatus 2 is configured such that Type-A port 16 will automatically advertise a maximum current level (e.g., 3 A) and Type-C port 14 will automatically advertise a lower set current level (e.g., 1.5 A).

Figure 2:
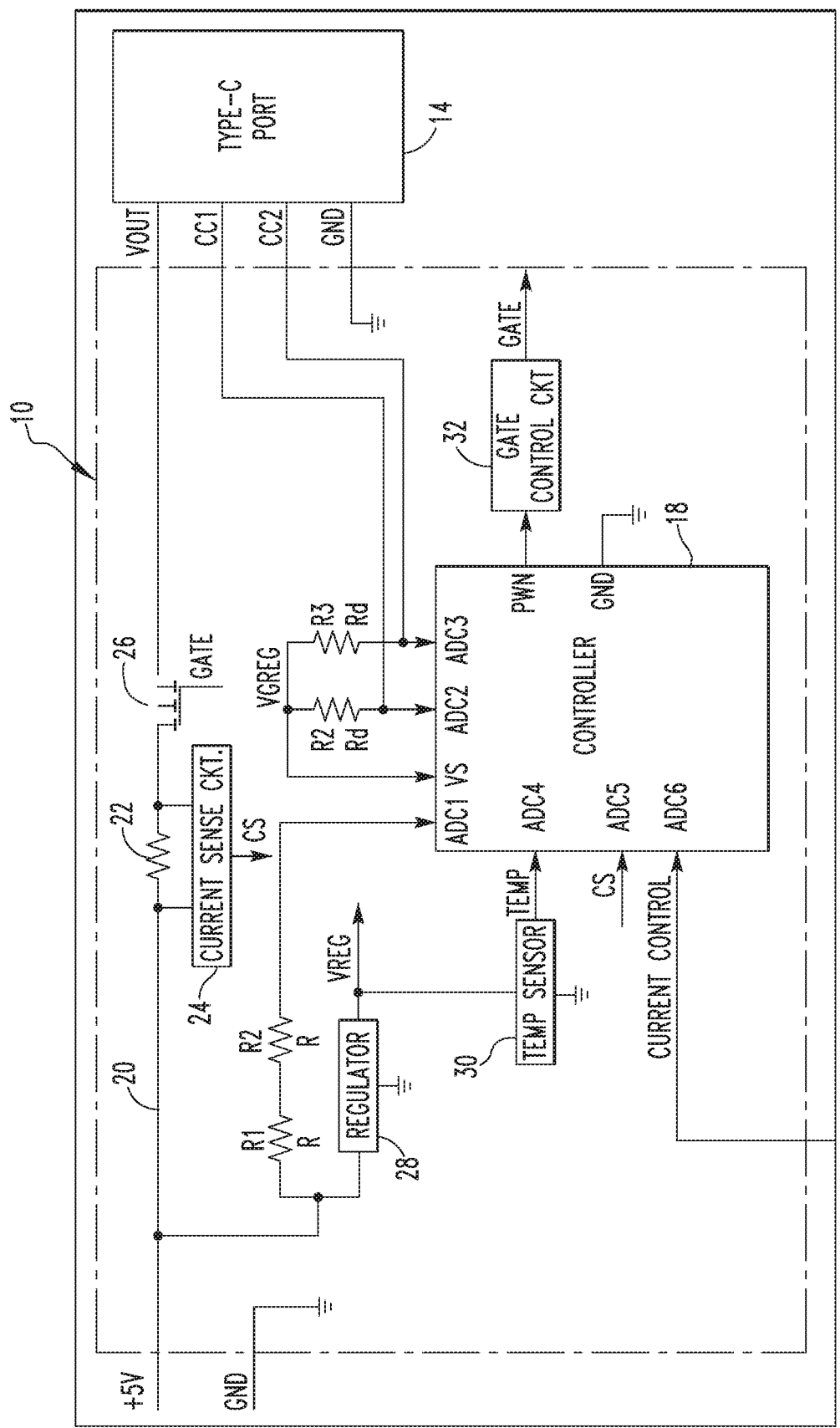
FIG. 2 is a schematic diagram showing a first portion of the combination charger apparatus of FIG. 1.

FIG. 2 is a schematic diagram showing Type-C circuit 10 according to the exemplary embodiment. Referring to FIG. 2, Type-C circuit 10 includes a controller 18 that is structured and configured to control the operation of combination charger apparatus 2 as described in detail herein (e.g., controller 18 is provided with one or more routines for this purpose). Type-C circuit 10 further includes a power rail 20 that receives the positive DC voltage from rectifier and signal conditioning circuit 8. A sense resistor 22 is provided in power rail 20. A current sense circuit 24 is coupled to power rail 20 in order to sense the current that is flowing through power rail 20 at any particular time by sensing the voltage drop across sense resistor 22. The output of current sense circuit 24 is provided to controller 18.

Power rail 20 further includes an electronic switch 26 (e.g., a MOSFET) that is provided between sense resistor 22 and Type-C port 14. In addition, a regulator circuit 28 is coupled to power rail 20 and provides a regulated input voltage (Vreg) that is used to power controller 18. A temperature sensor 30 is also provided in Type-C circuit 10. Temperature sensor 30 is powered by Vreg and senses the board temperature of Type-C circuit 10. The measured board temperature is provided to controller 18. Controller 18 is structured to shut Type-C circuit 10 down in the case of an over-temperature condition. The measured board temperature may also be used for thermal cycling of the operation of controller 18 if needed. In particular, a high temperature input can be used to scale down the charge current value, until the temperature reaches a safe limit.

A gate control circuit 32 is connected to controller 18. The output of gate control circuit 32 is provided to electronic switch 26. Controller 18 is structured to generate pulse width modulation (PWM) pulses which are provided to gate control circuit 32. Based upon the received PWM pulses, gate control circuit 32 will control electronic switch 26 and therefore control the current that is provided to Type-C port 14. As shown in FIG. 2, controller 18 is also operatively coupled to Type-C 14 for data transmission purposes.

Figure 3:
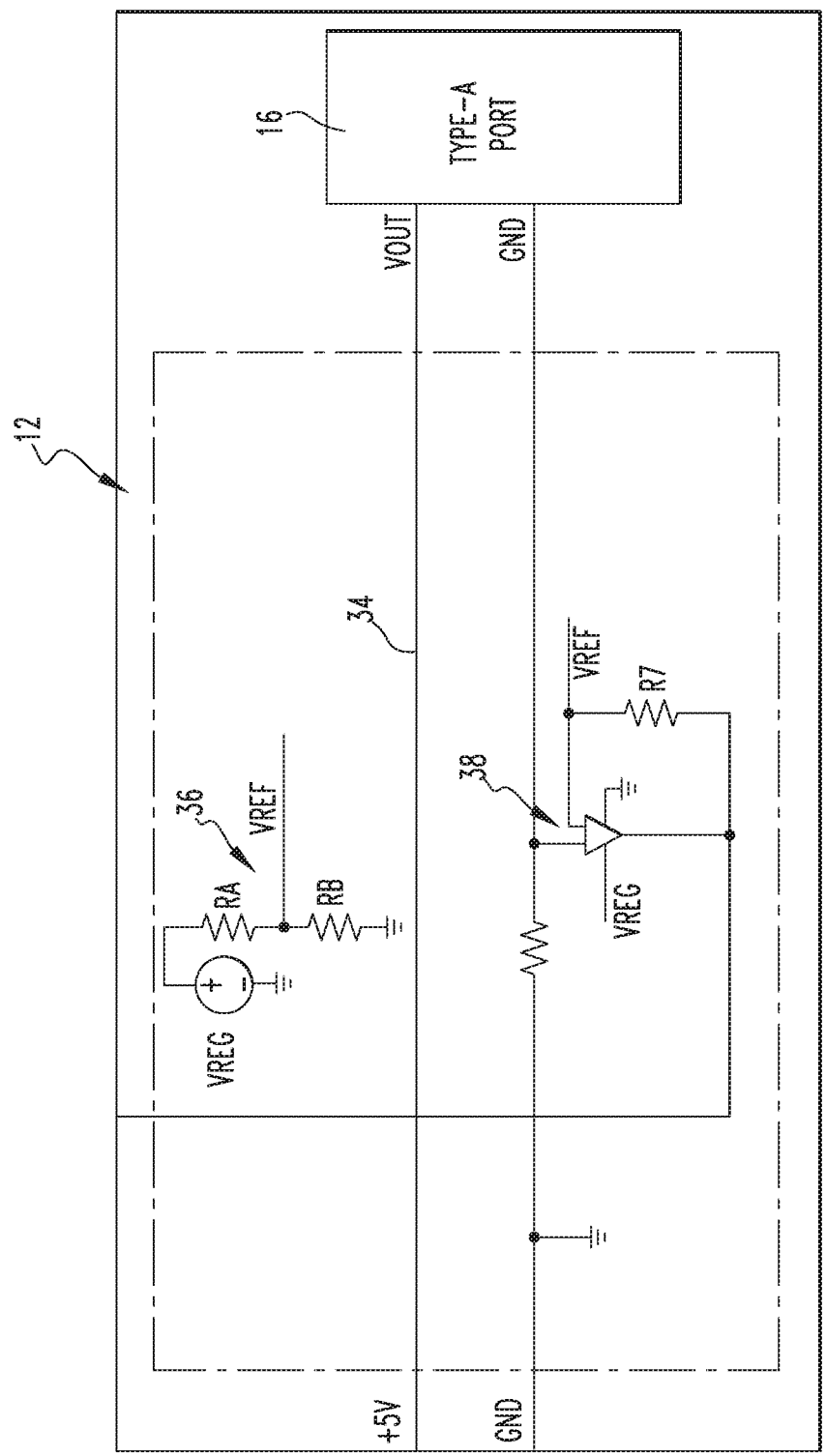
FIG. 3 is a schematic diagram showing a second portion of the combination charger apparatus of FIG. 1.

FIG. 3 is a schematic diagram showing Type-A circuit 12 according to the exemplary embodiment. Referring to FIG. 3, Type-A circuit 12 includes a power rail 34 that also receives the positive DC voltage from rectifier and signal conditioning circuit 8. As seen in FIG. 3, Vreg from regulator 28 is used to generate a reference voltage using a voltage divider circuit 36. The reference voltage is provided to a comparator 38 that is provided as part of Type-A circuit 12. The output of comparator 38 forms a current control signal that is provided as an input to controller 18 (FIG. 2).

In operation, the load current in Type-A circuit 12 is monitored using comparator 38, and the output thereof is used to determine how combination charger apparatus 2 is configured at any given time. In particular, if the load current in Type-A circuit 12 exceeds a predetermined threshold value (indicating that a device is connected to Type-A port 16 or requesting more current than a set current threshold value), the output of comparator 38, i.e., the current control signal, will go low. When controller 18 senses that the current control signal has gone low, controller 18 adjusts the PWM pulses provided to gate control circuit 32 in a manner that causes type-C-port 14 to change from advertising the maximum current level (e.g., 3 A) (the default state) to advertising the lower set current level (e.g., 1.5 A). In addition, under these conditions, Type-A port 16 will be caused to advertise the maximum current level (e.g., 3 A). If the load current in Type-A circuit 12 drops below the predetermined threshold (indicating that a device is not connected to Type-A port 16 or is requesting less current than the set current threshold value), the output of comparator 38, i.e., the current control signal, goes high. In response, if the Type-C circuit 10 current is determined to be above a threshold level based upon the output of current sense circuit 24, controller 18 will adjust the PWM pulses provided to gate control circuit 32 to cause Type-C port 14 to be configured to again advertise the maximum current level (e.g., 3 A), and Type-A port 16 will be caused to advertise the lower set current level (e.g., 1.5 A).

In an alternative embodiment, the current threshold levels described herein may be configurable by a user, such as by using a potentiometer or by any other suitable means, to give the user an option to select their own current threshold levels.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A charger apparatus, comprising:
a housing;
a first port supported by the housing;
a second port supported by the housing, the second port being of a different type than the first port;
a first circuit coupled to the first port and structured to advertise a first current at the first port;
a second circuit coupled to the second port and structured to advertise a second current at the second port; and
a controller, wherein the first circuit and the second circuit each receive a DC power signal generated from an AC input signal provided to the charger apparatus, and wherein the controller is structured and configured to determine whether a load current on the second circuit is above a threshold level and responsive to determining that the load current on the second circuit is above the threshold level, (i) cause the first circuit to advertise the first current at a level that is less than a maximum current level that may be advertised at the first port, and (ii) cause the second circuit to advertise the second current at a level that is equal to a maximum current level that may be advertised at the second port.

2. The charger apparatus according to claim 1, wherein the first port is a USB Type-C port and the second port is a USB Type-A port.

3. The charger apparatus according to claim 1, wherein the controller is provided as part of the first circuit.

4. The charger apparatus according to claim 1, wherein the controller is structured and configured to, responsive to the load current on the second circuit being below the threshold level, (i) cause the first circuit to advertise the first current at a level that is equal to the maximum current level that may be advertised at the first port, and (ii) cause the second circuit to advertise the second current at a level that is less than the maximum current level that may be advertised at the second port.

5. The charger apparatus according to claim 4, wherein the first circuit is structured to measure a load current on the first circuit, wherein the controller is structured and configured to, responsive to the load current on the second circuit being below the threshold level and if the load current on the first circuit is above a second threshold, (i) cause the first circuit to advertise the first current at a level that is equal to the maximum current level that may be advertised at the first port, and (ii) cause the second circuit to advertise the second current at a level that is less than the maximum current level that may be advertised at the second port.

6. The charger apparatus according to claim 4, wherein the second circuit is structured to generate and provide to the controller a signal indicative of whether the load current on the second circuit is above the threshold, and wherein the controller is structured and configured to determine whether the load current on the second circuit is above the threshold level based on the signal.

7. The charger apparatus according to claim 6, wherein the second circuit includes a comparator that is structured to generate the signal indicative of whether the load current on the second circuit is above the threshold by comparing a voltage measured in the second circuit to a voltage reference.

8. The charger apparatus according to claim 1, wherein the second circuit includes an electronic switch controlled by a gate control circuit that receives a pulse width modulation output from the controller, and wherein the level of the first current is determined based on control of the electronic switch by the gate control circuit in response to the pulse width modulation output.

* * * * *